United States Patent

Bush et al.

[11] Patent Number: 6,064,433
[45] Date of Patent: *May 16, 2000

[54] VIDEO FILMING METHOD AND APPARATUS

[75] Inventors: Richard John Bush, Andover; Robert Alexander, Basingstoke, both of United Kingdom

[73] Assignees: Sony Corporation, Tokyo, Japan; Sony United Kingdom Limited, Weybridge, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/606,030

[22] Filed: Feb. 22, 1996

[30] Foreign Application Priority Data

Mar. 30, 1995 [GB] United Kingdom .................... 9506551

[51] Int. Cl.$^7$ .................................................. H04N 5/238
[52] U.S. Cl. .......................... 348/364; 348/222; 358/518
[58] Field of Search ..................................... 348/207, 222, 348/223, 228, 266, 229, 233, 255, 256, 362, 364, 365, 366, 170; 358/909.1, 453, 518, 538; 382/164, 167, 282; 396/49

[56] References Cited

U.S. PATENT DOCUMENTS

| | | | |
|---|---|---|---|
| 4,525,736 | 6/1985 | Korman | 358/28 |
| 4,533,938 | 8/1985 | Hurst | 358/28 |
| 4,803,548 | 2/1989 | Kirk . | |
| 5,179,446 | 1/1993 | Hong | 358/224 |
| 5,243,418 | 9/1993 | Kuno et al. | 358/108 |
| 5,266,984 | 11/1993 | Muramatsu et al. | 396/49 |
| 5,557,325 | 9/1996 | Ueda et al. | 348/223 |

FOREIGN PATENT DOCUMENTS 2121645 12/1983 United Kingdom .
WO 87/06419 10/1987 WIPO .

*Primary Examiner*—Tuan Ho
*Assistant Examiner*—Christopher Onuaku
*Attorney, Agent, or Firm*—Frommer Lawrence & Haug, LLP.; William S. Frommer

[57] ABSTRACT

A method of filming a scene with a video camera whereby the brightness and/or colour of at least one selected area of a video image is adjusted by processing the video image data representing the video image prior to the video amplifier stage of the video camera. There is also provided a video apparatus having a processing means connected between the imaging device and the video amplifier and processor of a video camera.

21 Claims, 5 Drawing Sheets

VIDEO FILMING METHOD AND APPARATUS

BACKGROUND OF THE INVENTION

1. Field of the Invention

The present invention relates to a video filming method and apparatus. It has particular use in the filming of a non-uniformly lit scene, such as one lit by a variety of light sources of different intensities or colour temperatures or such as one where certain parts of the scene are shielded from one or more of those light sources.

2. Description of the Related Art

In any scene, there may well be different sources of light, each contributing its own colourisation and intensity to the various areas of the scene. This is true especially of scenes outside the controlled environment of a TV studio.

Typically, the chain of filming equipment comprising cameras, processors, etc is set up to handle only the most critical area of a scene. This has the result that the displayed image may contain colour casts and shading, "burnt-out" areas of highlights, areas of lost detail, etc.

These problems may arise outside, for instance, as a result of bright sunshine, or inside, as illustrated in FIG. 1 of the accompanying drawings.

FIG. 1 illustrates a typical indoor scene. The scene is illuminated by a combination of light sources including daylight, fluorescent tubes and tungsten lamps. Shadows are cast by these mixed sources, resulting in areas of the scene being illuminated to different proportions by the various light sources.

With the illustrated scene, some areas will be illuminated by the high intensity daylight source and others by the lower intensity artificial lamps. This will result in a range of luminance which would be too great to be rendered correctly by a TV camera and system. Furthermore, illumination by daylight will be blue for a camera set for the 3200° K. colour temperature of studio cast and lighting. Similarly, illumination by the fluorescent tubes will influence the colour of the image, since they have a line spectrum output in the range of 2900° K. to 8900° K.

Previously, as illustrated in FIG. 2 of the accompanying drawings, these problems have been dealt with by the use of additional corrective lighting, together with colour and neutral density filters. By correcting the variable light levels and colour temperatures of the mixed sources, a scene may be produced which, when viewed through the television system, will give an acceptable result. In particular, neutral density filters may be placed over the windows to reduce the luminance level of the daylight source, colour correcting filters may be placed over the windows and fluorescent tubes to match the desired colour temperature (fluorescent tubes tend to cause a magenta colour cast), bulbs may be replaced with colour corrected types and, finally, additional lighting may be added to reduce the loss of detail in shadows.

This known method tends to reduce the ambient feel of a set or location. It is also costly as a result of the wide selection of filters required and the significant time needed to set up a correctly balanced scene. Furthermore, this method is not well adapted to reacting to changes in the scene, e.g. resulting from panning of the camera across the scene or daylight changing with time of day or weather conditions.

OBJECT AND SUMMARY OF THE INVENTION

It is an object of the present invention to provide an improved system of filming such scenes.

According to the present invention there is provided a method of filming with a video camera having an imaging device for producing video image data representing the video image and a video amplifier stage. The method comprises adjusting the brightness and/or colour of at least one selected area of the video image by processing the video image data prior to its processing by the video amplifier stage of the video camera.

According to the present invention there is also provided a video apparatus comprising a video camera having an imaging device for producing video image data representing a video image. The apparatus also has a selection means for enabling an operator to designate a selected area of the video image and enter information regarding the brightness and/or colour of the selected area. Processing means are connected to the imaging device and the selection means for processing the video image data of the selected area so as to adjust the brightness and/or colour of the selected area according to the entered information. A video amplifier and processor is connected to the output of the processing means.

According to the present invention, there is also provided a video camera device for use with a video camera, having an imaging device for producing video image data representing a video image and having a video amplifier and processor. The device is adapted for insertion into the camera and is arranged for connection to the output of the imaging device and the input of the video amplifier and processor. It comprises processing means for processing video image data of a selected area of the video image so as to adjust the brightness and/or colour of the selected area.

Thus, with the present invention, the need to change a scene by introducing filters, changing light sources and introducing new light sources is not necessary. By processing the video image signal, it is possible to allow selective correction by an operator of luminance and chrominance abberations within the scene so as to render the image acceptable.

Furthermore, by doing this processing directly after the video image data is produced by the imaging device and before any restrictions on its dynamic range are imposed by the video amplifier and processor, loss of detail, which would occur if processing was carried out at a later stage, is avoided.

DETAILED DESCRIPTION OF THE PREFERRED EMBODIMENTS

The present invention will be more clearly understood from the following description given by way of example only, with reference to the accompanying drawings.

Figure 1:
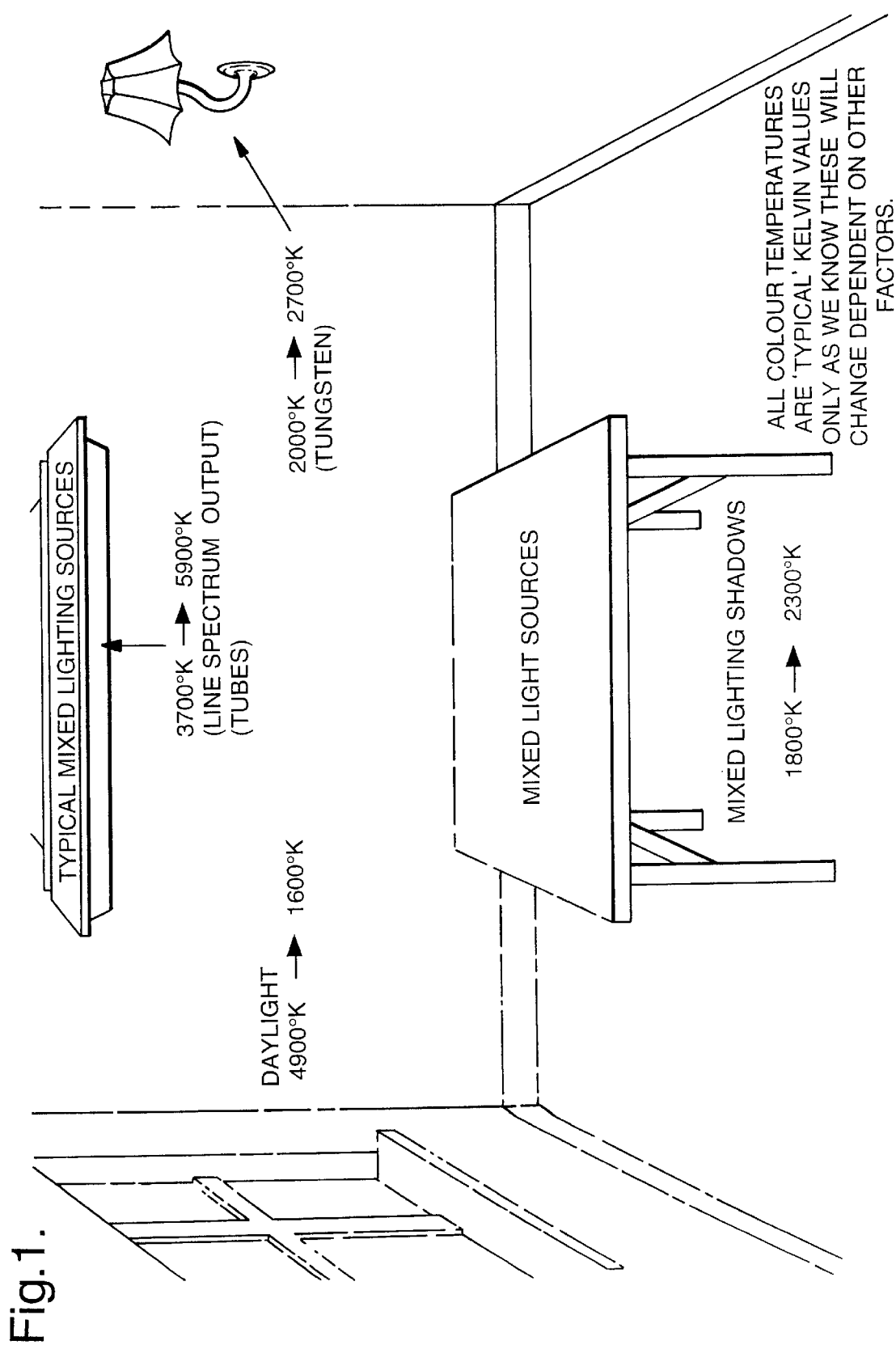
FIG. 1 illustrates a typical scene having mixed light sources.
Figure 2:
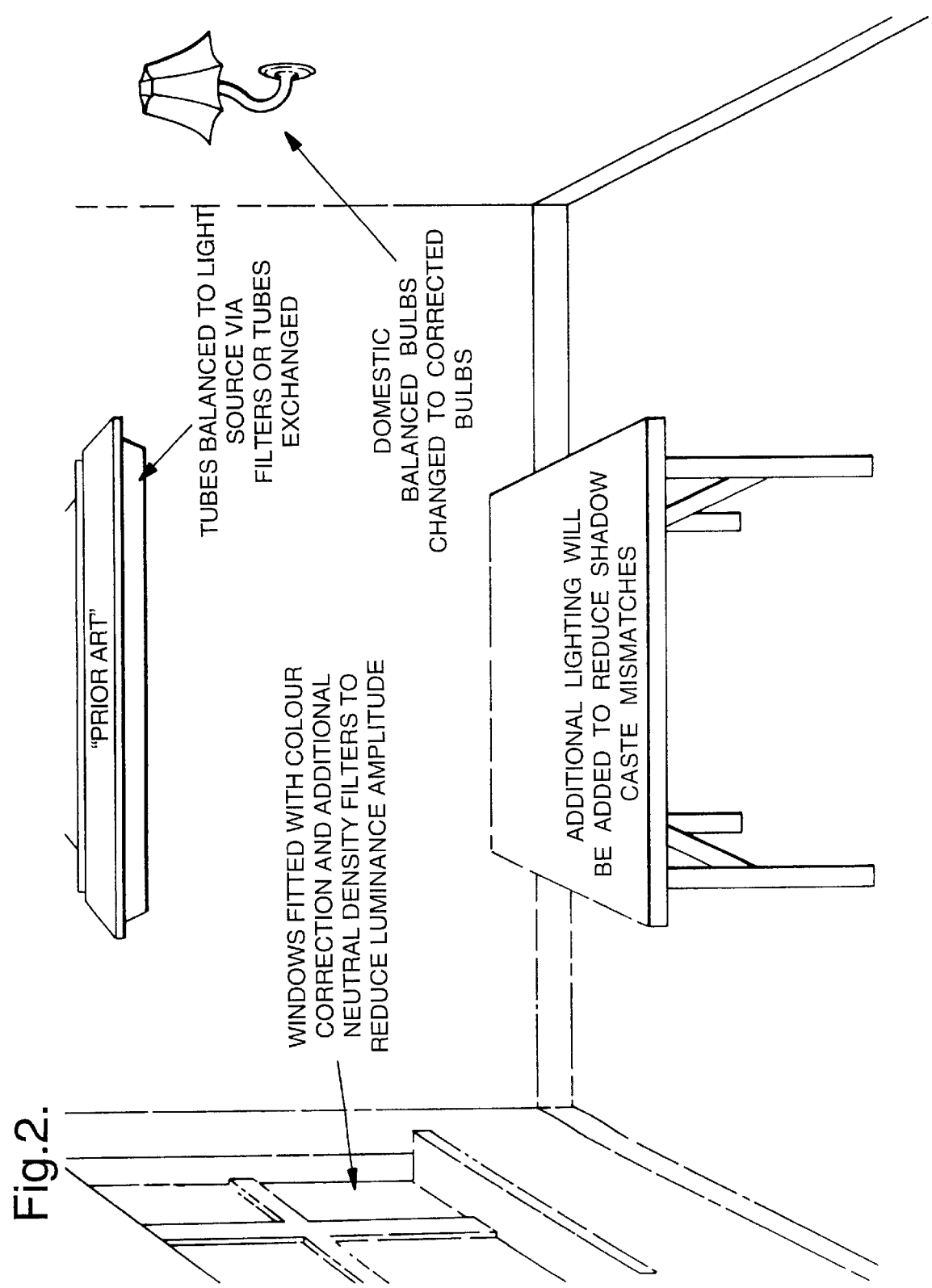
FIG. 2 illustrates the corrective measures taken according to the prior art.
Figure 3:
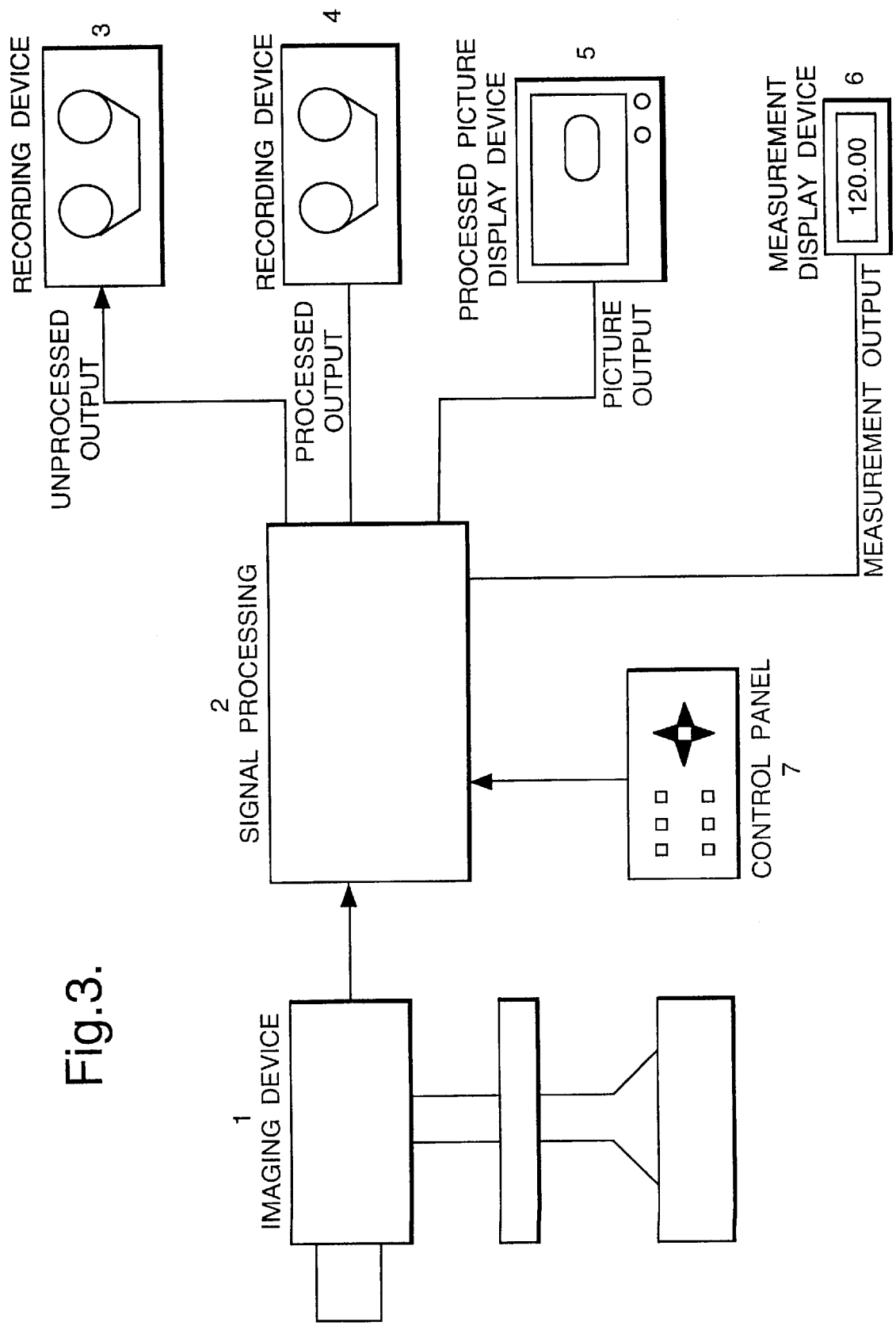
FIG. 3 illustrates an overall system embodying the present invention.

FIG. 3 illustrates schematically a system including a signal processing unit 2 embodying the present invention. The signal processing unit 2 receives a video signal from an imaging device 1 and is controlled by any suitable control panel 7 including, for instance, keys, a joystick, a tracker ball or a mouse.

Figure 5:
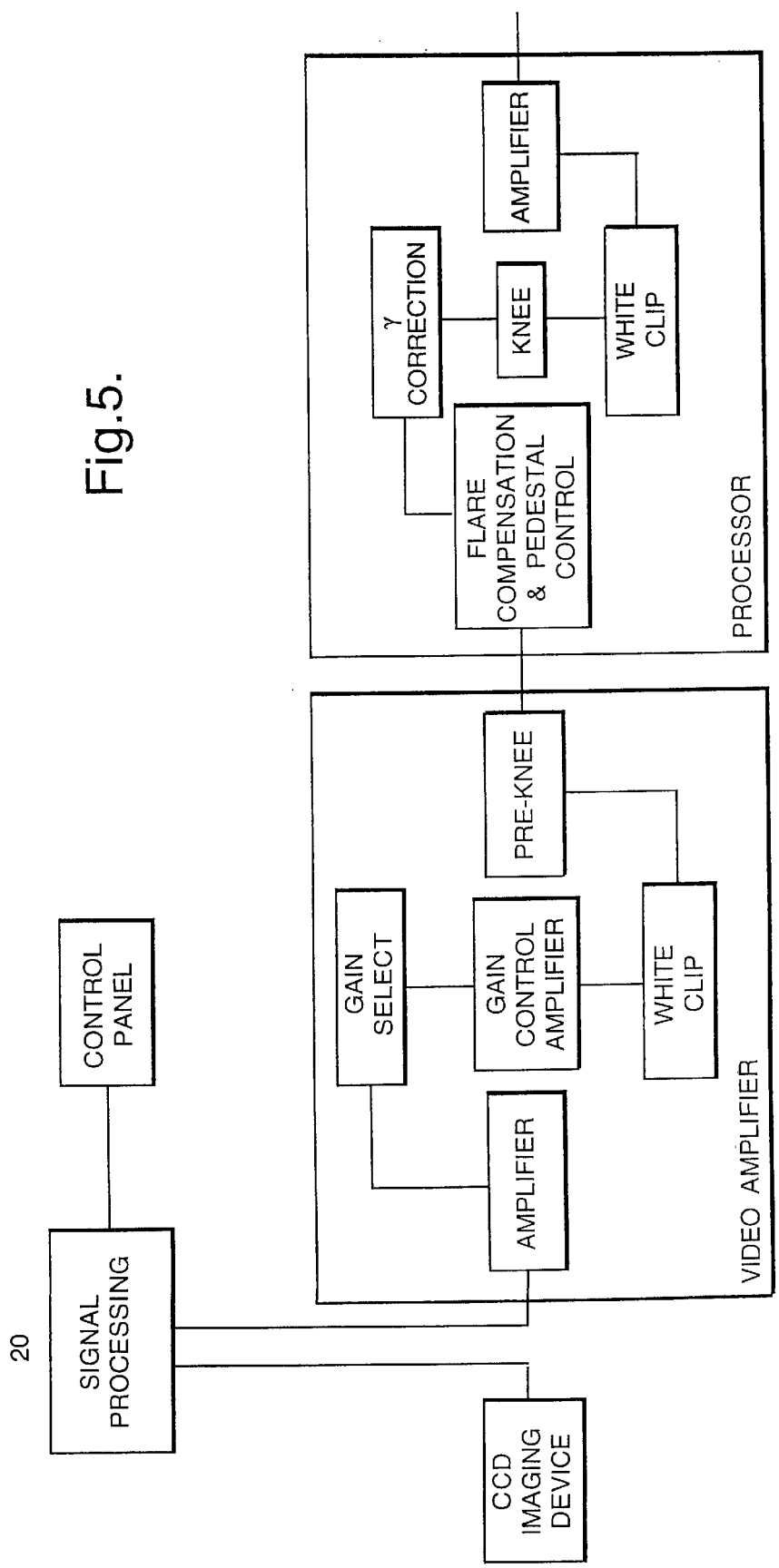
FIG. 5 illustrates an embodiment of the present invention in a video camera.

In the system of FIG. 3, the signal processing unit 2 is connected to recording devices 3 and 4 so as to record both processed and unprocessed signals. Furthermore, it is connected to a display device 5 and a measurement display device 6, for displaying respectively the image signal and a measurement signal. However, in a preferred embodiment of the present invention as illustrated in FIG. 5, the signal processing unit 20 is supplied with a video signal from the imaging device 1 of the video camera and passes its output back to the video amplifier of the video camera. Preferably, it comprises an additional circuit board for insertion into the video camera itself. In this way, the signal processing unit makes use of the output processing of the video camera, such that the video camera may be connected to recording devices and display devices in a normal way.

Figure 4:
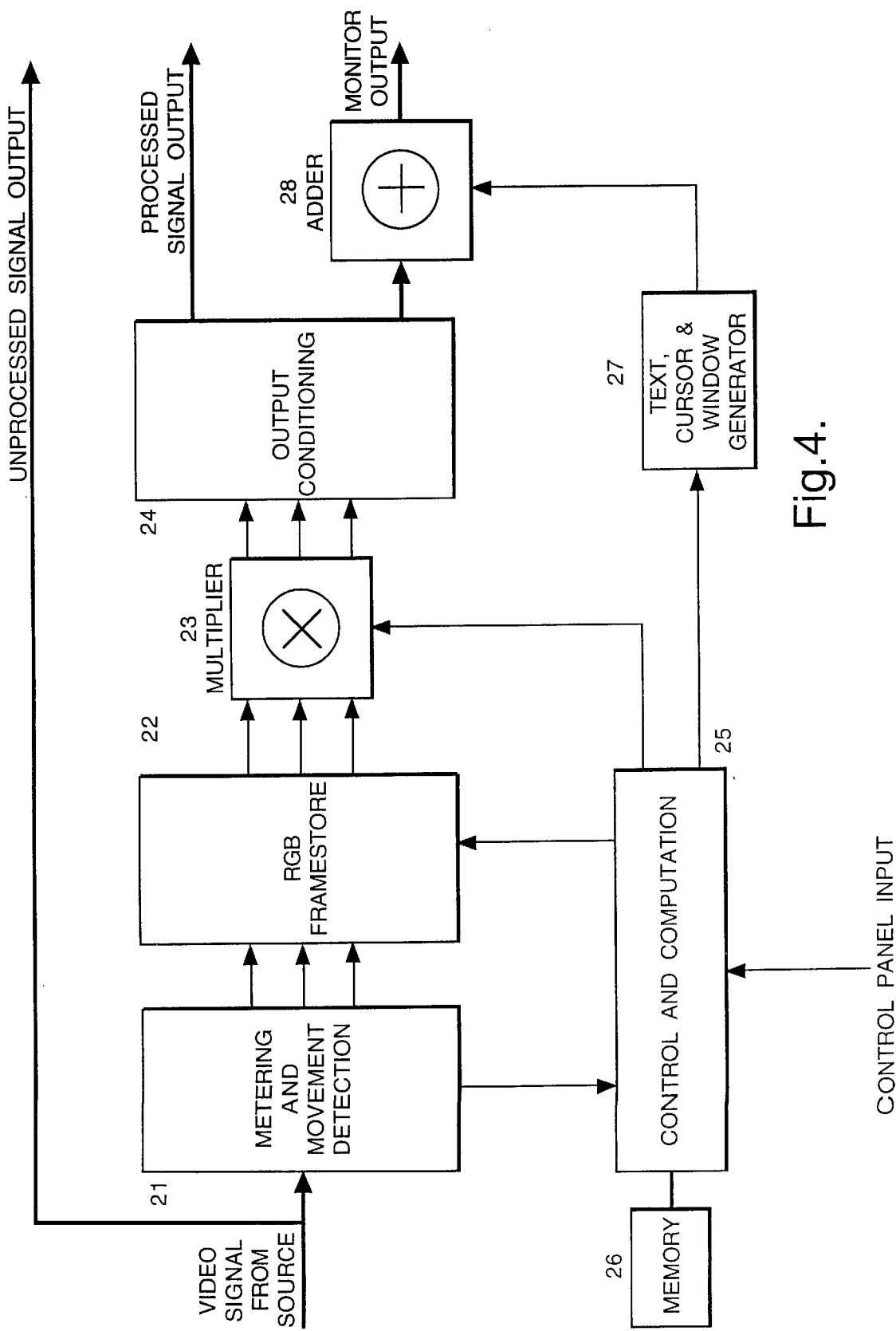
FIG. 4 illustrates an embodiment of the present invention.

The signal processing unit 2 will now be described with additional reference to FIG. 4.

The video signal input to the signal processing unit 20 is input to the metering and movement detection unit 21. As illustrated, the unprocessed signal is also sent on in parallel, for instance to the video amplifier of FIG. 5 without further processing. However, a switch may be used to selectively supply or by-pass the signal processing unit 20.

The metering and movement detection unit 21 supplies information regarding the video image to a control and computation unit 25. In the preferred embodiment, the video image is processed as red, green and blue components. Thus, as illustrated in FIG. 4, the metering and movement detection unit 21 is connected to the RGB frame store 22 for supplying the red, green and blue components to the RGB frame store 22.

The RGB frame store 22 is controlled by the control and computation unit 25 and supplies the red, green and blue components of the video image to a multiplier 23 which is also under the control of the control and computation unit 25. In this way, the control and computation unit 25 can individually cause portions of the red, green and blue components of a video image to be scaled such that the luminance and chrominance of the video image may be adjusted on a pixel by pixel basis.

The multiplier 23 supplies the red, green and blue components to an output conditioning unit 24 which may include additional video processing and a feed back to the control and computation unit 25 to ensure correct processing.

The output conditioning unit 24 then supplies the processed signal for further processing, for instance as illustrated in FIG. 5, and then recording.

An output of the conditioning unit 24 is also supplied, via an adder 28, to the display device 5. The adder is used to combine text, cursor and window information with the process signal output. The text, cursor and window information is generated by a text, cursor and window generator 27 under the control of the control and computation unit 25. It causes the video image to be displayed together with text, cursors, outlining, etc.

Preferably, a memory 26 is connected to the control and computation unit 25 so that information regarding correction of the various areas of the video image may be stored.

In operation, the control panel 7 is used in conjunction with the control and computation unit 25, the text, cursor and window generator 27 and the adder 28 to identify and select areas of concern on the display device 5. This is most simply achieved by the operator moving a cursor on the display device so as to draw a line outlining those areas.

Preferably, the control and computation unit 25 then operates in conjunction with the metering and movement detection unit 21 to search for colour or brightness transitions in the vicinity of the boundary marked out on the display device 5. In this way, the operator need only approximately identify the areas requiring adjustment for the control and computation unit 25 to establish the precise boundaries.

Once an area has been selected in this way, the control and computation unit 25 may establish from the metering and movement detection unit 21, the brightness and colour temperature of the light source. For the convenience of the operation, these values may be displayed on measurement display device 6 in the FIG. 3 embodiment or included as text with the video image in the FIG. 4 embodiment. Furthermore, if necessary, these values may be stored in memory 26, together with information regarding position of the selected area in question.

On the basis of the colouring and brightness of the selected areas of the image on the display device and/or the measured colour temperatures and brightness, the operator may then adjust the image as required. For instance, a selected area which is too bright may have the brightness of its pixels reduced so as to prevent subsequent clipping and loss of detail. Thus, according to the input from the control panel 7, the control and computation unit 25 may calculate the required multiplication factors for the red, green and blue components so that the multiplier 23 may apply those factors to pixels within the selected area.

It is preferable that the device employs some fuzzy logic so that, particularly where there is no sharp transition between areas of differing illumination, the correction factors are applied to the video image so as to give a smooth transition in the image.

Once the areas have all been selected in this way, the control and computation unit 25 operates in conjunction with the metering and movement detection unit 21 and memory 26 so that as areas of the image move, the correction factors stored in the memory 26 may be applied to the pixels corresponding to the selected area in its new position.

The memory may store data for an entire scene such that it may be recalled at some later date when a similar scene is being filmed.

Preferably, the control and computation unit 25 in conjunction with the metering and movement detection unit 21 responds to changes in colour or brightness of the selected areas so that if an object moves into shadow or illumination of a different colour temperature, the operator is alerted or the correction factors automatically cancelled.

It is also possible to provide different correction factors for the same object (selected area) in different positions. The memory 26 may store the correction factors and positions so that when the object moves between those approximate positions, the correction factors may be changed in turn with interpolation at the intervening positions. Ideally, the interpolation is responsive to the detected colours and brightness of the selected areas, such that a correction factor is changed as the colour/brightness of a selected area changes.

Although movement of objects within the image may be detected electronically, for instance by means of edge detection, it is also possible to detect movement of the camera and use this information to provide information regarding movement of objects as viewed by the camera. For example, transducers may be provided to detect tilting and panning of the camera and also to detect zooming of its lenses. The output of such transducers can then be used to predict how the filmed image will change.

We claim:

1. A method of filming with a video camera having an imaging device for producing video image data representing a moving video image and a video amplifier stage, the method comprising:

specifying a selected area of the moving video image, a first correction factor and a second correction factor;

searching for brightness and/or color transitions in the vicinity of a boundary of the selected area by analyzing video image data output from the imaging device;

redefining the selected area as being bounded by the transitions; and adjusting the brightness and/or color of said selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image.

2. A method according to claim 1, comprising accounting for variations in colour and/or brightness between different areas of the video image by selecting an area and applying said processing to the selected area.

3. A video apparatus comprising:

a video camera having an imaging device for producing video image data representing a moving video image;

means for enabling an operator to designate a selected area of the moving video image, a first correction factor for adjusting the brightness and/or color of the selected area, and a second correction factor for adjusting the brightness and/or color of the selected area, and including means for searching for brightness and/or color transitions in the vicinity of a boundary of the selected area by analyzing video image data output from the imaging device and means for redefining the selected area as being bounded by the transitions;

processing means for adjusting the brightness and/or color of the selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image; and a video amplifier and processor connected to the output of the processing means.

4. An apparatus according to claim 3 further comprising a display device for displaying video image data output by the video amplifier and processor, the selection means being arranged to enable an operator to select an area of the video image by indicating the area on the display device.

5. An apparatus according to claim 4 wherein the selection means comprises at least one of a plurality of keys, a joystick, and a pointing device such as a track ball or mouse for controlling an on-screen-cursor displayed on the display device.

6. An apparatus according to claim 3 further comprising means for measuring the brightness and/or colour temperature of the selected areas.

7. An apparatus according to claim 3 wherein the processing means is operative to calculate, in response to the entered information for each respective selected area, correction parameters for adjusting the brightness and/or colour of pixels in the respective selected area.

8. An apparatus according to claim 7 further comprising a memory for storing the correction parameters of respective selected areas.

9. An apparatus according to claim 3 further comprising movement detection means for detecting movement of selected areas between successive frames.

10. A video camera device for use with a video camera, having an imaging device for producing video image data representing a moving video image and having a video amplifier and processor, the video camera device being capable of insertion into the camera and being arranged for connection to the output of the imaging device and the input of the video amplifier and processor, the video camera device comprising:

means for selecting an area of the moving video image for processing and for specifying a first correction factor and a second correction factor;

means for searching for brightness and/or color transitions in the vicinity of a boundary of the selected area by analyzing video image data output from the imaging device;

means for redefining the selected area as being bounded by the transitions; and processing means for adjusting the brightness and/or color of the redefined selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image.

11. A video apparatus comprising:

a video camera with an imaging device for producing moving video image data and a video amplifier and processor;

means for selecting an area of a video image;

means for searching for brightness and/or color transitions in the vicinity of a boundary of the selected area by analyzing video image data output from the imaging device;

means for redefining the selected area as being bounded by the transitions;

means for specifying a first correction factor for adjusting the brightness and/or color of the selected area and a second correction factor for adjusting the brightness and/or color of the selected area; and means for adjusting the brightness and/or color of the selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image.

12. An apparatus according to claim 11 further comprising a display device for displaying video image data output by the video amplifier and processor, the selection means being arranged to enable an operator to select an area of the video image by indicating the area on the display device.

13. An apparatus according to claim 12 wherein the selection means comprises at least one of a plurality of keys, a joystick, and a pointing device such as a track ball or mouse for controlling an on-screen-cursor displayed on the display device.

14. An apparatus according to claim 11 further comprising means for measuring the brightness and/or colour temperature of the selected areas.

15. An apparatus according to claim 11 wherein the processing means is operative to calculate, in response to the entered information for each respective selected area, correction parameters for adjusting the brightness and/or color of pixels in the respective redefined selected area.

16. An apparatus according to claim 15 further comprising a memory for storing the correction parameters of respective selected areas.

17. An apparatus according to claim 11 further comprising movement detection means for detecting movement of selected areas between successive frames.

18. A method of filming with a video camera having an imaging device for producing video image data representing a moving video image and a video amplifier stage, the method comprising:

adjusting the brightness and/or color of at least one selected area of the video image by processing the video image data prior to its processing by the video amplifier stage of the video camera; and detecting movement of the selected area between successive frames so that said step of adjusting the brightness and/or color of said selected area is performed for the successive frames, wherein a first correction factor is used to adjust the brightness and/or color of said selected area when said area is at a first position within said moving image, a second correction factor is used to adjust the brightness and/or color of said selected area when said area is at a second position within said moving image, and a third correction factor is used to adjust the brightness and/or color of said selected area when said area is at a position other than said first position or said second position, said third correction factor being generated by interpolation based on said first correction factor and said second correction factor, such that said first, second and third correction factors depend on the position of said selected area within said image.

19. A video apparatus comprising:

a video camera having an imaging device for producing video image data representing a moving video image;

selection means for enabling an operator to designate a selected area of the moving video image and to specify a first correction factor and a second correction factor;

processing means connected to the imaging device and the selection means for adjusting the brightness and/or color of the selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image;

a video amplifier and processor connected to the output of the processing means; and means for detecting movement of the selected area between successive frames so that said processing is performed for the successive frames.

20. A video camera device for use with a video camera, having an imaging device for producing video image data representing a moving video image and having a video amplifier and processor, the video camera device being capable of insertion into the camera and being arranged for connection to the output of the imaging device and the input of the video amplifier and processor, the video camera device comprising:

processing means for processing video image data of a selected area of the video image by adjusting the brightness and/or color of the selected area according to a first correction factor when said selected area is at a first position within said moving image, according to a second correction factor when said selected area is at a second position within said moving image, and according to a third correction factor when said selected area is at a position other than said first position or said second position, said third correction factor being generated by interpolation based on said first correction factor and said second correction factor, such that said first second and third correction factors depend on the position of said selected area within said image; and means for detecting movement of the selected area between successive frames so that said adjusting is performed for the successive frames.

21. A video apparatus comprising:

a video camera with an imaging device for producing video image data and a video amplifier and processor;

means for enabling an operator to select an area of a moving video image and to specify a first correction factor and a second correction factor;

processing means connected to the imaging device and the selection means for processing the video image data of the selected area by adjusting the brightness and/or color of the selected area according to said first correction factor when said selected area is at a first position within said moving image, according to said second correction factor when said selected area is at a second position within said moving image, and according to a third correction factor when said selected area is at a position other than said first position or said second position, said third correction factor being generated by interpolation based on said first correction factor and said second correction factor, such that said first, second and third correction factors depend on the position of said selected area within said image; and means for detecting movement of the selected area between successive frames so that said adjusting is performed for the successive frames.

* * * * *